United States Patent
Katz et al.

(10) Patent No.: US 7,149,547 B2
(45) Date of Patent: Dec. 12, 2006

(54) DIVERSITY TRANSMISSION

(75) Inventors: Marcos Katz, Oulu (FI); Juha Ylitalo, Oulu (FI)

(73) Assignee: Nokia Corporation, Espoo (FI)

( * ) Notice: Subject to any disclaimer, the term of this patent is extended or adjusted under 35 U.S.C. 154(b) by 228 days.

(21) Appl. No.: 10/202,638

(22) Filed: Jul. 25, 2002

(65) Prior Publication Data
US 2003/0032453 A1 Feb. 13, 2003

Related U.S. Application Data

(63) Continuation of application No. PCT/FI01/00065, filed on Jan. 25, 2001.

(30) Foreign Application Priority Data
Jan. 28, 2000 (FI) .................................. 20000176

(51) Int. Cl.
*H04M 1/00* (2006.01)
*H04Q 7/20* (2006.01)
(52) U.S. Cl. ............... 455/562.1; 455/101; 455/434; 455/442; 455/561; 370/320; 370/342
(58) Field of Classification Search ............. 455/562.1, 455/101, 434, 436, 442, 561, 422.1, 424, 455/516, 517, 25; 370/320, 342
See application file for complete search history.

(56) References Cited

U.S. PATENT DOCUMENTS

| | | | |
|---|---|---|---|
| 5,666,123 A * | 9/1997 | Chrystie | 342/373 |
| 5,680,142 A | 10/1997 | Smith et al. | |
| 5,771,017 A * | 6/1998 | Dean et al. | 342/374 |
| 5,966,670 A * | 10/1999 | Keskitalo et al. | 455/562.1 |
| 6,301,238 B1 * | 10/2001 | Hagerman et al. | 370/336 |
| 6,453,177 B1 * | 9/2002 | Wong et al. | 455/562.1 |
| 6,697,641 B1 * | 2/2004 | Shapira | 455/562.1 |

FOREIGN PATENT DOCUMENTS

| | | |
|---|---|---|
| EP | 847 978 | 4/1995 |
| WO | WO 98/36596 | 8/1998 |

OTHER PUBLICATIONS

Ylitalo et al., "An Adaptive Antenna Method for Improving Downlink Performance of CDMA Base Stations," IEEE 5th International Symposium on Spread Spectrum Techniques and Applications, 1998 Proceedings, vol. 2, pp. 599-603.

Katz et al., "Beamspace-Time Coding Method for Downlink Performance Enhancement of CDMA Micro/Pico-Cell Base Stations," Proceedings 1999 Finnish Signal Processing Symposium (FINSIG '99), May 31, 1999, University of Oulu, Oulu, Finland, pp. 25-29.

* cited by examiner

*Primary Examiner*—Edan Orgad
(74) *Attorney, Agent, or Firm*—Pillsbury Winthrop Shaw Pittman LLP

(57) ABSTRACT

The invention relates to a method and a system for implementing diversity in transmission utilizing orthogonal antenna beams formed using digital beam forming methods. In this method antenna beams are directed to be adjacent so as to set at least one of the estimated directions of arrival of the received signal within the range between antenna amplification maximums of the antenna beams and signal is sent using said antenna beams. An advantage provided by the method and system of the invention is to improve the performance of the system in the downlink direction and also to reduce the imbalance between the uplink performance and the downlink performance. The method of the Invention also allows to carry out power control specifically for each antenna beam.

28 Claims, 4 Drawing Sheets

DIVERSITY TRANSMISSION

FIELD OF THE INVENTION

This application is a Continuation of International Application PCT/Fl01/00065 filed Jan. 25, 2001 which designated the U.S. and was published under PCT Article 21(2) in English.

The invention relates to a method and a system for implementing diversity in transmission utilizing orthogonal antenna beams formed using digital beam forming methods.

BACKGROUND ART

In the future, as the number of users of wireless radio communication, such as cellular radio systems, increases and as high-speed data transmission in said systems becomes more popular, an increase in system capacity by improving the performance of the system is vitally important. A solution to this problem is to use one or more adaptive antenna groups instead of sector antennas. In an antenna group, individual antenna elements are typically located close to one another, or approximately half a wavelength apart from one another. Typically the number of antennas in such groups is divisible by two in order to alleviate the Fourier conversion, and the number of antennas is adequate in order to provide a desired coverage area. The basic principle of the method is to employ narrow radiation beams, which are directed as straight as possible towards a desired receiver. The commonly known methods used by adaptive antenna groups can be divided into two main groups: radiation beams are directed towards a receiver or the most appropriate one is selected from several alternative beams. An appropriate beam is selected for a downlink transmission or the beam is redirected on the basis of the information received from the uplink direction. The reuse of the frequencies can be intensified and the power of the transmitters can be reduced, as the directivity of the antenna beams allows to reduce the interference caused to other users.

Antenna beams are directed in a digital system by dividing a signal in the baseband parts into I and Q branches and by multiplying the signal in each antenna element in a complex manner (phase and amplitude) by appropriate weighting coefficients and thereafter by adding together the output signals in all the antenna elements. An adaptive antenna group comprises in this case in addition to the antenna a signal processor that automatically adapts the antenna beams using a control algorithm by redirecting the antenna beams into the direction of the strongest measured signal. The directivity of the beams can also be carried out in an analogue manner by generating orthogonal radiation beams using Butler matrixes and fixed phasing circuits in which the phase increases antenna by antenna. This method simply measures which beam receives most signal energy, or the strongest signal, and selects this beam for the transmission.

Publication Katz and Ylitalo, Beamspace-time Coding method for Downlink Performance Enhancement of CDMA Micro/Picocell Base Stations, Proceedings of Finnish Signal Processing Symposium (FINSIG'99), Oulu, Finland, 1999 pages 25 to 29, which is incorporated herein by reference, presents a method in which orthogonal antenna beams are used in downlink transmission as a function of an angular spread. It is an object of the invention to reduce the interference caused to other users at the same time as the downlink operation is improved utilizing Beamspace-Time-Coded transmission. In this method a signal is sent using two beams in different time slots in such a manner that a first symbol is sent using a first beam in a first time slot and a second symbol using a second beam. Thereafter a complex conjugate of the second symbol is sent using the first beam in the second time slot and a complex conjugate of the first symbol using the second beam. Since the signal is sent using two orthogonal, or uncorrelating, channels, the chance to carry out a successful transmission increases.

BRIEF DESCRIPTION

It is an object of the invention to provide an improved transmission diversity method. This is achieved with a method for implementing transmission diversity in a radio system, the method comprising the steps of determining directions of arrival for a received signal, forming orthogonal antenna beams in a transmitter, and directing the antenna beams to be adjacent so as to set at least one of the estimated arrival directions of the received signal within the range between antenna amplification maximums of the antenna beams and transmitting signal using said antenna beams.

The invention also relates to a radio transmitter implementing the method comprising: means for determining directions of arrival for a received signal, means for forming orthogonal antenna beams, and the radio transmitter comprising means for directing the antenna beams to be adjacent so as to set at least one of the estimated arrival directions of the received signal within the range between antenna amplification maximums and means for transmitting signal using said antenna beams.

The preferred embodiments of the invention are disclosed in the dependent claims.

An advantage provided by the method and system of the invention is to improve the performance of the system in the downlink direction and also to reduce the imbalance between the uplink performance and the downlink performance. The improved quality in the downlink direction is particularly important in applications in which data is sent using high bit rates. The method of the invention also allows to carry out power control specifically for each antenna beam.

BRIEF DESCRIPTION OF THE DRAWINGS

In the following the invention will be described in greater detail by means of the preferred embodiments with reference to the accompanying drawings, in which.

DETAILED DESCRIPTION OF PREFERRED EMBODIMENTS

Figure 1:
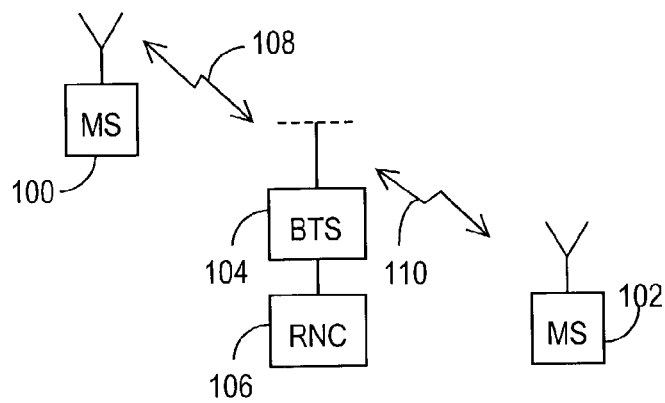
FIG. 1 illustrates an example of a telecommunications system.

The present invention may be employed in different wireless communications methods such as cellular radio systems. The multiple access method to be used is not relevant. For example, the CDMA (Code Division Multiple Access), the WCDMA (Wideband Code Division Multiple Access) and the TDMA (Time Division Multiple Access) or the hybrids thereof are all possible. It is obvious for those skilled in the art that the method of the invention can also be applied to systems using different modulation methods or air interface standards. FIG. 1 illustrates in a simplified manner a digital data transmission system, to which the solution of the invention can be applied. What is concerned is a part of a cellular radio system, which comprises a base station 104 having a bi-directional connection 108 and 110 with subscriber terminals 100 and 102 that may be fixedly located, vehicle mounted or portable hand-held terminals. The base station comprises, for instance, transceivers. The base station transceivers communicate with an antenna unit that allows to implement a bi-directional radio connection with the subscriber terminal. The base station also communicates with a base station controller 106 which transmits the terminal connections to other parts of the network. The base station controller controls several base stations communicating therewith in a centralized manner. The base station controller comprises a group switching field, which is used to connect speech and data and to combine signalling circuits. The base station system composed of the base station and the base station controller also comprises a tanscoder. The transcoder is generally located as close as possible to a mobile services switching centre, as speech can then be transferred in cellular radio network mode between the transcoder and the base station controller, thus saving transmission capacity. A control unit located in the base station controller carries out call control, mobility management, collection of statistical data and signalling.

The cellular radio system may also communicate with a public switched telephone network, in which case the transcoder converts different digital speech coding modes used between a public switched telephone network and a cellular radio network to suit one another, for instance, from the 64 kbit/s fixed network form to another form (such as 13 kbit/s) of the cellular radio network, and vice versa.

Figure 2:
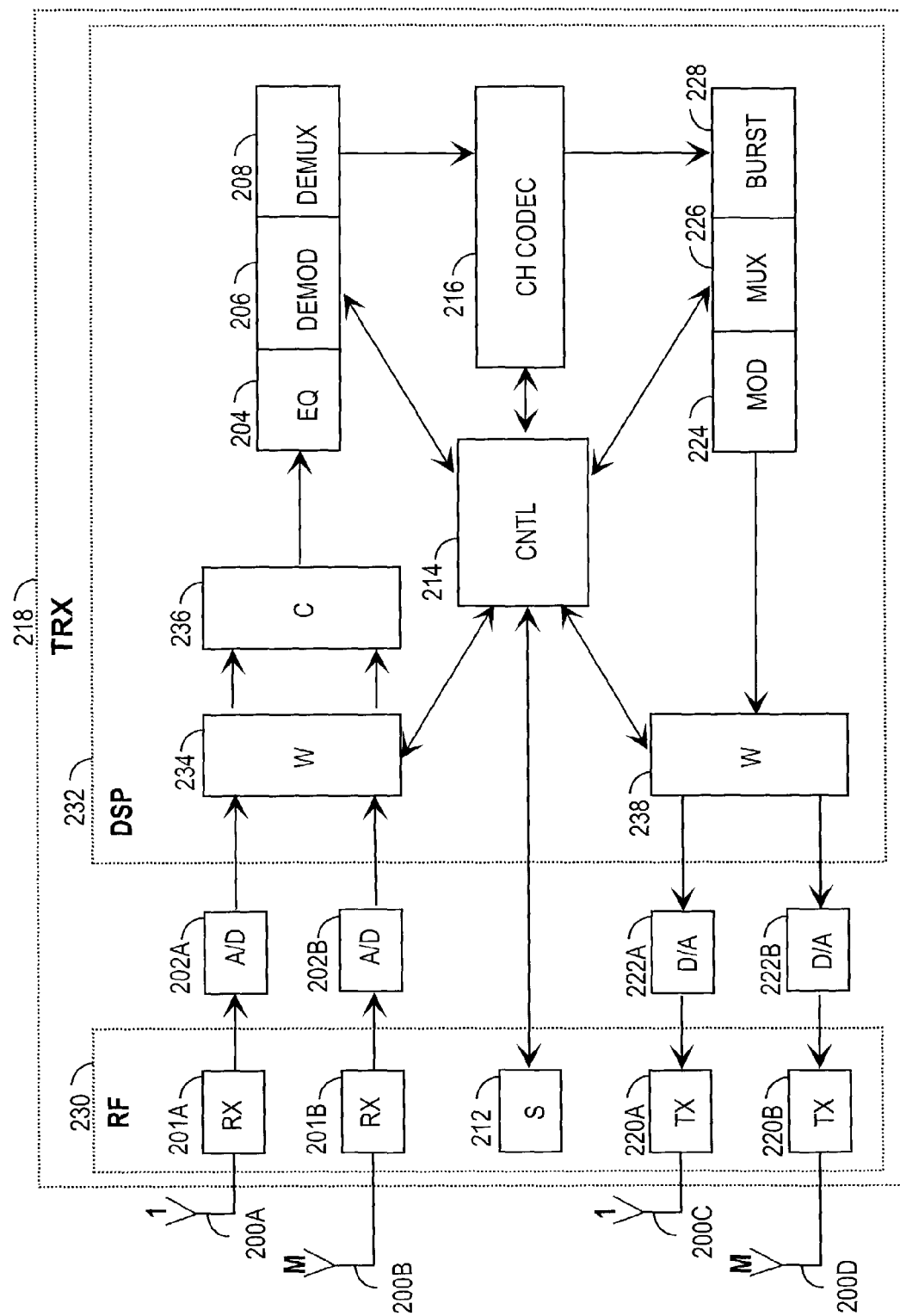
FIG. 2 shows a transceiver.

FIG. 2 shows in more detail the structure of a transceiver 218. An antenna group employing directed antenna beams comprises several separate elements 200A, 200B, for example eight different elements, by means of which the antenna beam is directed in reception. There may be M antenna elements, and M is thereby an integer higher than one. The same antenna elements can be used in transmission and in reception, or as FIG. 2 shows the transmission is provided with specific antenna elements 200C, 200D. The antenna elements are arranged linearly or planarly, for example.

Linearly the elements can be arranged for example to a ULA (Uniform Linear Array) in which the elements are placed on a line with even spacings. A CA (Circular Array) can, for instance, be planarly formed, where the elements are placed at the same level, for example, horizontally into a periphery of a circle. A particular part of the circle periphery is then covered, for instance 120 degrees, or even the total 360 degrees. Said single-stage antenna structure may, in principle, be employed to construct also two or three-dimensional structures. A two-dimensional structure is formed for example by placing the ULA structures in parallel, in which case the elements form a matrix.

A multi-path propagated signal is received through the antenna elements. Each antenna element comprises specific receivers 201A, 201B which are radio frequency parts 230.

The receiver 201 comprises a filter that blocks the frequencies outside the desired frequency band. Thereafter the signal is converted into an intermediate frequency or directly onto baseband, in which mode the signal is sampled and quantized in an analogue/digital converter 202A, 202B.

The multipath-propagated signals shown in complex mode are then applied to a digital signal processing processor including software 232. The antenna pattern of the received signal is directed using the digital phasing of the signal, in which case the antenna elements do not have to be mechanically directed. Then the direction of the subscriber terminal 100, 102 is indicated as a complex vector, which is formed of an elementary unit generally indicated as a complex number corresponding to each antenna element. Each individual signal is multiplied by the elementary unit of the antenna element in weighting means 234. Thereafter the signals can be combined in combination means 236.

Signal phasing can also be performed for a radio frequency signal or possibly for an intermediate frequency signal to be used. Thus the weighting means 234 are placed at the radio frequency parts 230 or between the radio frequency parts and the analogue/digital converters 202A, 202B.

An equalizer 204 compensates for interference caused by multipath propagation, for example. From the equalized signal, a demodulator 206 takes a bit stream that is transferred to a demultiplexer 208. The demultiplexer 208 separates the bit stream from different time-slots to specific logical channels. A channel codec 216 decodes the bit stream of the different logical channels, or decides whether the bit stream is signalling information to be transferred to a control unit 214, or whether the bit stream is speech to be transferred to a speech codec of the base station controller 106. The channel codec 216 also performs error correction. The control unit 214 carries out internal control tasks by controlling the different units.

In the transmission, a burst former 228 adds a known sequence and a tail to the data received from the channel codec 216. A multiplexer 226 assigns a specific time slot to each burst. A modulator 224 modulates the digital signals to a radio frequency carrier. The signal is multiplied in weighting means 238 by an elementary unit corresponding to each antenna element. The antenna beam can thus be directed in digital phasing in the direction of the complex vector formed by the elementary units.

The signal is converted from digital to analogue mode using, a digital/analogue converter 222A, 222B. Each signal component is transmitted to a receiver 220A, 220B corresponding to each antenna element.

The transmitter comprises a filter restricting the bandwidth. In addition, the transmitter controls the output power of a transmission. A synthesizer 212 arranges the required frequencies for the different units. The synthesizer comprises a clock which may be locally controlled or it may be centrally controlled from somewhere else, for instance from the base station controller 106. The synthesizer creates the required frequencies by means of a voltage controlled oscillator, for example.

Figure 3:
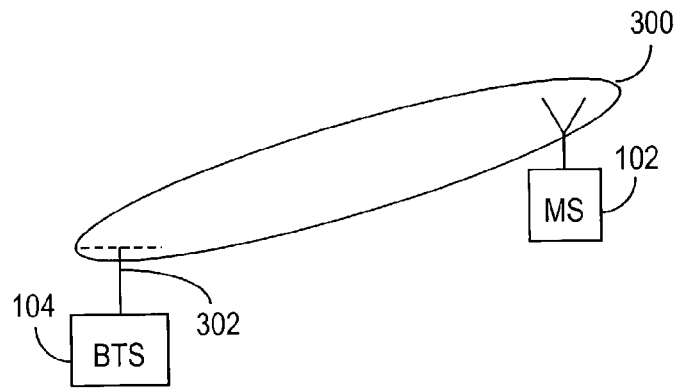
FIG. 3 shows how to use directed antenna beams.

FIG. 3 describes the use of directed antenna beams. For clarity, the Figure shows only one directed antenna beam 300. In an FDD (Frequency Division Duplex) system, different frequencies are employed in the uplink and downlink directions. It is unreliable to determine the directions of optimal downlink burst-specific beams due to fading. However, the base station system 104 must know in which direction the subscriber terminal 102 is located. This piece of information is formed, for example in the GSM system (Global System for Mobile Communication), utilizing the known training sequence included in the signal received from the uplink direction. Correspondingly, in CDMA systems a pilot signal can be used to deduce the directions of arrival received from the uplink direction as well as the location of the receiver. As to the antenna group 302, the direction is indicated for instance as an angle in relation to the geographic west-east axis.

Figure 4:
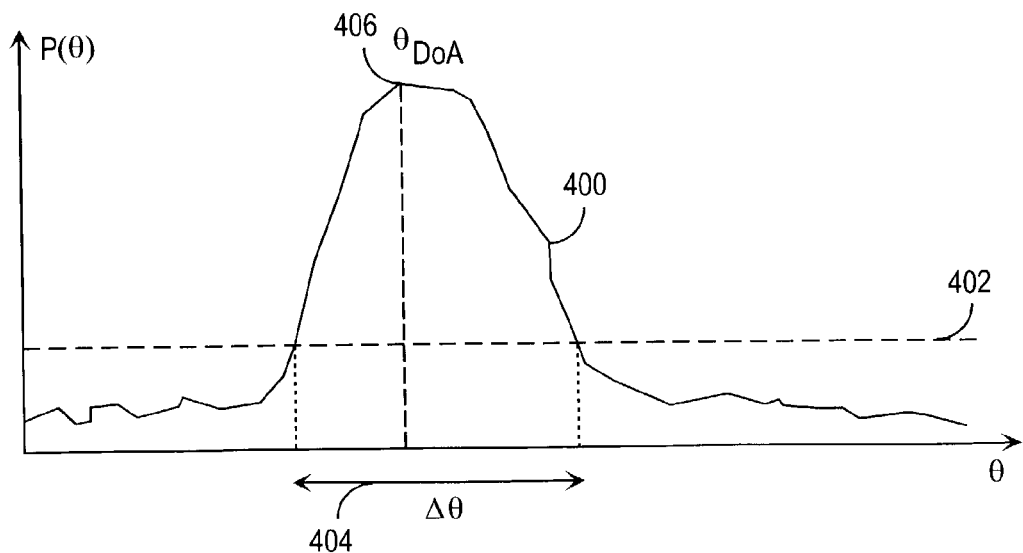
FIG. 4 shows how to measure angular spread and an angle of arrival from the uplink direction.

What can also be used are blind estimation methods, which do not assume that the received signal includes known parts. These methods calculate the direction, from which the strongest signal is received. FIG. 4 shows a Direction of Arrival, DoA, estimation method. In this method the estimation provides an angular power spectrum P (θ) of the received signal as a function 400 of the angle θ. Angular spread is the set of angles θ, by which the power P (θ) of an impulse response exceeds a selected threshold value 402. In FIG. 4 the angular spread is indicated by arrow 404. In general, it is preferable to select an angle of arrival $\theta_{DoA}$ as the transmission angle, from where the strongest signal power 406 was received. In this method the Fourier conversion can be used for estimating the arrival angles. The received signal is correlated with possible different arrival angles in order to estimate the angular power spectrum. The angular power spectrum shows the angles having correlation peaks, i.e. the direction from which a strong signal was received. The application of the method according to the invention is not dependent on the method used for determining the directions of arrival of the received.

Figure 5:
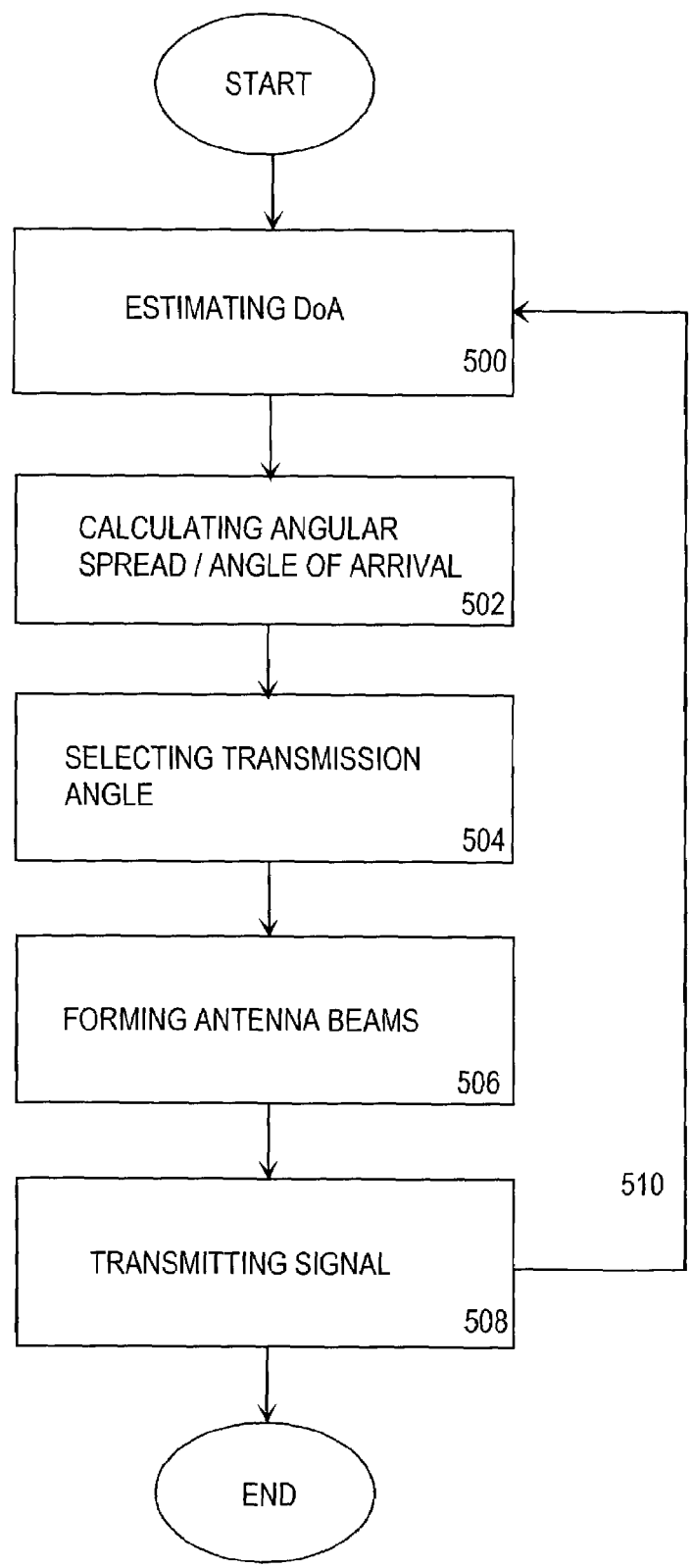
FIG. 5 is a flow chart showing the measures to be carried out in transmission.
Figure 7:
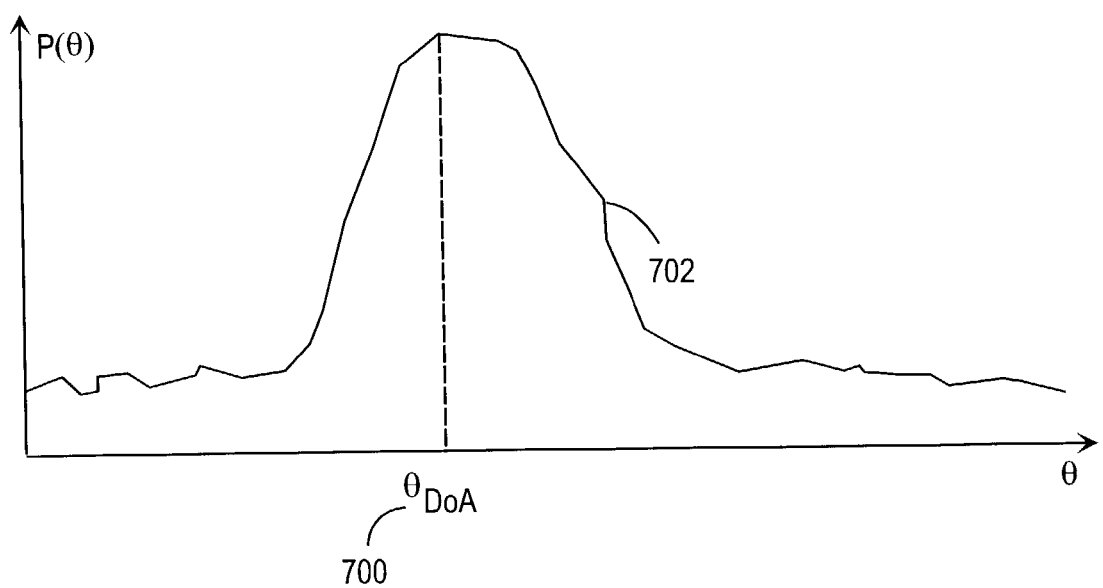
FIG. 7 shows the distribution of the angle of arrival.

FIG. 5 is a flowchart showing an example of the measures to the applied in transmission. In accordance with what is shown, the location of the received signal is to start with estimated in block 500 typically by estimating at first the angular power spectrum. In block 502 the arrival angles or the angular spread of the received signal is calculated using the angular power spectrum. The directions of arrival are thus determined for the received signal. In block 504 one or more transmission angles are chosen, for example, so as to select one or more of the angles among the arrival angles of the received signal, from which the highest signal power was received. A delay spread also affects the determination of the transmission angle. What causes the delay spread is that the delays of the signals propagated in various ways deviate from one another. Then in block 506 two adjacent, mutually orthogonal diversity antenna beams are formed by means of a known digital beam forming method, and the antenna beams are directed to be adjacent in such a manner that the arrival angle of the received signal is set within the range between the antenna amplification maximums of the antenna beams, and the maximum amplification of either of the two antenna beams is not directed straight towards the arrival angle. When forming antenna beams the transmission power, the beam direction and mode, or generally the beam breadth, are typically determined. If the distribution of the arrival angles is symmetrical in relation to the DoA, it is preferable to select the same transmission power for both antenna beams. FIG. 7 shows a situation where an arrival angle distribution 702 is asymmetrical in relation to a direction of arrival 700, $\theta_{DoA}$. It is then preferable to direct as much as possible of the transmission power to a direction from where a strong signal was received. The arrival angle distribution also determines the beam breadth: when the distribution is broad it is generally preferable to provide a broad antenna beam. In general, it is preferable to form an antenna beam pair separately for each selected transmission angle. The signal can be sent using several transmission angles and thus an antenna beam pair. The antenna beams are directed by selecting a series of complex multipliers implementing the desired transmission angle, said series including a specific multiplier for each antenna element in the antenna group. The eventual motion of the receiver is monitored by directing the antenna beams. In block 508 signal is sent using the formed and directed antenna beams. Feedback 510 presents how the process continues and allows the antenna beams to be used to monitor the receiver in motion.

Figure 6:
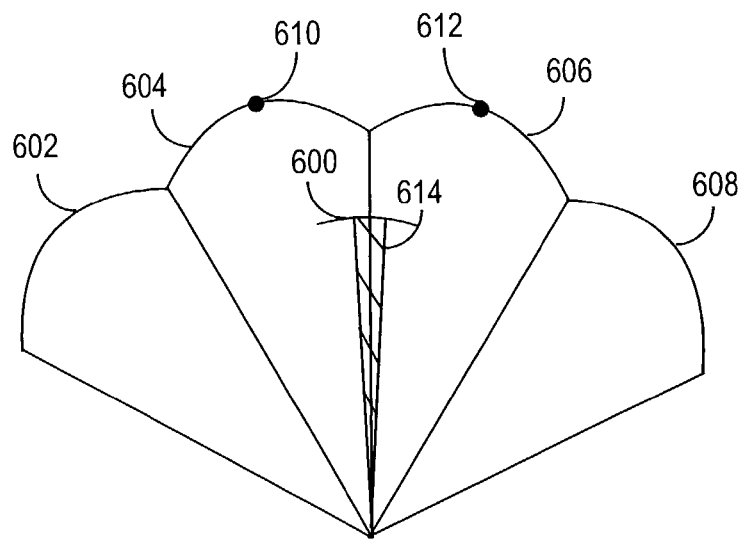
FIG. 6 shows directed antenna beams.

FIG. 6 shows the antenna beams of the invention. The Figures show four antenna beams 602, 604, 606 and 608. It is obvious for those skilled in the art that the number of beams may be larger or smaller than the described four. Line 600 describes for example the angular spectrum determined on the basis of the received signal. The Figure shows a situation, in which the transmission powers are identical in all antenna beams, since the angular spectrum is symmetrical in relation to the direction of arrival. When the power of the received signal is higher within the range of the second transmission antenna beam, the transmission power of this antenna beam is correspondingly set at a higher level. The transmission antenna beams can also be modified for example by altering the beam breadth using a known method. The antenna beams are generated using a known beam forming method, such as the Digital Beam Forming method (DBF). In the situation described the antenna beams 604 and 606 are directed to be adjacent in such a manner that an arrival angle 614 calculated in an angular spectrum 600 of the received signal is set within the range between antenna amplification maximums 610 and 612 of the antenna beams.

It is previously assumed that it is always more preferable to direct an antenna beam as straight as possible towards a receiver, as a maximum antenna amplification is thus achieved. However, the simulations carried out by the inventors show that a higher total antenna amplification is achieved by applying the method described herein. Antenna amplification is achieved for two different reasons: signal is sent using two orthogonal beams, whose fading properties are independent of one another, and it seems unlikely that the signals of both beams fade, and the antenna amplification increases, since the antenna amplification is the vector sum of the antenna amplification in both antennas. Thus, compared with a prior art solution the lost antenna amplification is regained and additional amplification is achieved on account of the uncorrelation of the beams.

The method of the invention can be applied in particular when the angular spread is low compared to the antenna beam breadth, or typically to macro-cell solutions. The method of the invention explained above can also be used in combination with other different transmission methods, for example so that the number, direction, power and breadth of the antenna beams is selected as preferably as possible taking the location of the receiver and/or the properties of the radio channel into account. The method of the invention is applicable to be used together with a Space-Time Transmit Diversity (STTD) method or with any other diversity solution. In the space-time transmit diversity STTD a signal is continuously sent using at least two different antennas to a subscriber terminal. The signal to be sent through different antennas is different. Two ways exist for carrying out the difference: the space-time trellis codes and space-time block codes. The codes are formed using a trellis formula in which each possible space and the branches starting therefrom and leading to other spaces are illustrated by two symbols. When the initial position of the trellis is known the bits to be coded can be indicated in a trellis formula with symbols indicating the transfer to be carried out between different levels. The symbols obtained are then divided for transmission through different antennas.

The bits to be coded in the Space-Time block codes are divided into two-bit sequences, for example, and the symbols to be sent are formed thereof in such a manner that a first symbol to be sent through a first antenna is formed of a first bit and of a complex conjugate of a second bit, and a symbol to be sent through a second antenna is formed of a second bit and of a complex conjugate of the first bit.

It is obvious for those skilled in the art that the method of the invention can be used for transmission in both the uplink and downlink directions, and the method can also be used for improving the interference tolerance of a fixed radio network. The method can preferably be applied in multipath-propagation environments, in which the DoA estimation methods frequently provide many angles, from which signal was received and to which the transmission is to be directed.

Even though the invention has been described above with reference to the example of the accompanying drawings, it is obvious that the invention is not restricted thereto but can be modified in various ways within the scope of the inventive idea disclosed in the attached claims.

The invention claimed is:

1. A method for implementing transmission diversity in a radio system, the method comprising:
   determining directions of arrival for a received signal,
   forming orthogonal antenna beams in a transmitter,
   directing the orthogonal antenna beams to be adjacent so as to set at least one of the estimated directions of arrival of the received signal within the range between antenna amplification maximums of the orthogonal antenna beams, and
   transmitting signal using the orthogonal antenna beams.

2. The method of claim 1, wherein the power of each antenna beam is separately determined.

3. The method of claim 1, wherein the powers of the antenna beams are substantially equal.

4. The method of claim 1, wherein the breadth of each antenna beam is separately determined.

5. The method of claim 1, wherein the breadths of the antenna beams are substantially equal.

6. The method of claim 1, wherein the shape of each antenna beam is arranged to an angular response of the radio channel.

7. The method of claim 1, wherein the location of a direction of arrival distribution of the received signal in relation to the transmission antenna beams determines the breadth of the transmission antenna beams.

8. The method of claim 1, wherein the location of the direction of arrival distribution of the received signal in relation to the transmission antenna beams determines the transmission power.

9. A transceiver comprising
   means for determining directions of arrival for a received signal,
   means for forming orthogonal antenna beams,
   means for directing orthogonal antenna beams to be adjacent so as to set at least one of the estimated directions of arrival of the received signal within the range between antenna amplification maximums, and
   means for transmitting signal using the orthogonal antenna beams.

10. The transceiver of claim 9, wherein the transceiver is arranged to determine the power of each antenna beam separately.

11. The transceiver of claim 9, wherein the transceiver is arranged to determine the powers of the antenna beams to be substantially equal.

12. The transceiver of one of claims 9 to 11, wherein the transceiver comprises means for determining the breadth of each antenna beam separately.

13. The transceiver of one of claims 9 to 11, wherein the transceiver comprises means for determining the breadths of the antenna beams to be substantially equal.

14. The transceiver of claim 9, wherein the transceiver comprises the means for arranging the shape of each antenna beam to the angular response of a radio channel.

15. The transceiver of claim 9, wherein the transceiver comprises the means for determining the breadth of the transmission antenna beams utilizing the location of the direction of arrival distribution of the received signal in relation to the transmission antenna beams.

16. The transceiver of claim 9, wherein the transceiver comprises the means for determining the transmission power utilizing the location of the direction of arrival distribution of the received signal in relation to the transmission antenna beams.

17. A network element comprising:
   means for determining directions of arrival for a received signal;
   means for forming orthogonal antenna beams;
   means for directing orthogonal antenna beams to be adjacent so as to set at least one of the estimated directions of arrival of the received signal within the range between antenna amplification maximums; and
   means for transmitting a signal using the orthogonal antenna beams.

18. The network element of claim 17, wherein the network element is arranged to determine the power of each antenna beam separately.

19. The network element of claim 17, wherein the network element is arranged to determine the powers of the antenna beams to be substantially equal.

20. A device comprising:
   means for determining directions of arrival for a received signal;
   means for forming orthogonal antenna beams;
   means for directing orthogonal antenna beams to be adjacent so as to set at least one of the estimated directions of arrival of the received signal within the range between antenna amplification maximums; and
   means for transmitting a signal using the orthogonal antenna beams.

21. The device of claim 20, wherein the device is arranged to determine the power of each antenna beam separately.

22. The device of claim 20, wherein the device is arranged to determine the powers of the antenna beams to be substantially equal.

23. A module comprising:
   means for determining directions of arrival for a received signal;
   means for forming orthogonal antenna beams;
   means for directing orthogonal antenna beams to be adjacent so as to set at least one of the estimated directions of arrival of the received signal within the range between antenna amplification maximums; and
   means for transmitting a signal using the orthogonal antenna beams.

24. The module of claim 23, wherein the module is arranged to determine the power of each antenna beam separately.

25. The module of claim 23, wherein the module is arranged to determine the powers of the antenna beams to be substantially equal.

26. A user terminal comprising:
- means for determining directions of arrival for a received signal;
- means for forming orthogonal antenna beams;
- means for directing orthogonal antenna beams to be adjacent so as to set at least one of the estimated directions of arrival of the received signal within the range between antenna amplification maximums; and
- means for transmitting a signal using the orthogonal antenna beams.

27. The user terminal of claim 26, wherein the user terminal is arranged to determine the power of each antenna beam separately.

28. The user terminal of claim 26, wherein the user terminal is arranged to determine the powers of the antenna beams to be substantially equal.

* * * * *